United States Patent [19]
Smith et al.

[11] 3,915,091
[45] Oct. 28, 1975

[54] ROCKET POWERED ROUND

[76] Inventors: Matthew S. Smith, 4400 Sarah, Apt. 29, Burbank, Calif. 91505; Ernest A. Filippi, 18776 Kenya St., Northridge, Calif. 91324

[22] Filed: May 29, 1973

[21] Appl. No.: 364,861

[52] U.S. Cl................. 102/49.2; 89/1 F; 89/1.818; 89/14 SB
[51] Int. Cl.²......................................... F42B 13/28
[58] Field of Search.......................... 102/49.1–49.7; 89/1 F, 1.818, 14 SB

[56] References Cited
UNITED STATES PATENTS

| | | | |
|---|---|---|---|
| 767,920 | 8/1904 | Ball...................................... | 102/49 |
| 880,386 | 2/1908 | Maxim .............................. | 89/14 SB |
| 2,426,239 | 8/1947 | Rener............................ | 102/49.7 X |
| 3,008,414 | 11/1961 | Jasse............................ | 102/49.7 X |
| 3,179,052 | 4/1965 | Jasse................................... | 244/3.28 |
| 3,397,638 | 8/1968 | Gould..................................... | 102/49.7 X |
| 3,610,096 | 10/1971 | Bauman et al..................... | 89/1.816 |
| 3,750,574 | 2/1972 | Lohkamp.......................... | 102/34.1 |

FOREIGN PATENTS OR APPLICATIONS

| | | | |
|---|---|---|---|
| 124,779 | 4/1919 | United Kingdom............... | 89/14 SB |
| 1,336,054 | 7/1963 | France................................ | 89/1.818 |
| 278,821 | 5/1962 | Netherlands...................... | 102/49.2 |
| 662,429 | 12/1951 | United Kingdom............... | 102/49.1 |

OTHER PUBLICATIONS

"Stability and Dispersion Analysis for Rockets and Projectiles" by M. Smith 1970.
Dictionary of Guided Missiles and Space Flight Merrill Editor COpyright 1959 D. Van Nostrand Company Inc. pp. 117, 118, 584.
Exterior Ballistics of Rockets Davis et al. D. Van Nostrand Company Copyright 1958 pp. 137, 147.
Mathematical Theory of Rocket Flight Rosser et al. McGraw-Hill 1947 pp. 59, 71.

*Primary Examiner*—Harvey E. Behrend
*Assistant Examiner*—Harold Tudor
*Attorney, Agent, or Firm*—Don B. Finkelstein

[57] ABSTRACT

A rocket powered round for launching from a tubular type mortar launcher barrel. The round incorporates a rocket propellant grain for powered flight and may have a boost portion providing a boost thrust and a sustainer probe portion providing a sustainer thrust. A war head is coupled to the rocket motor containing the rocket propellant grain and the war head has streamlined bore riding alignment pins coupled to the external surfaces thereof for engagement with the inside surfaces of the tubular launcher barrel during the launch phase. A launch cartridge means is detachably coupled to the rocket motor casing adjacent the aft end thereof and has an insertion portion frictionally retained in the nozzle of the rocket motor. The frictional force allows detachable coupling of the launch cartridge means to the rocket motor means. The launch cartridge means has an ignition charge for both igniting a launch propellant charge which provides the launch thrust for launching the weapon from the tubular launcher as well as initiating ignition of the rocket motor. The gases generated by the combustion of the launch charge are reacted by the aft end of the launch cartridge thereby accelerating the round to its launch velocity. A stripper plate is coupled to the end of the launcher barrel for engaging the launch cartridge means to detach the launch cartridge means from the round at the end of the launch from the barrel. The boost portion of the rocket propellant grain provides the boost thrust for the boost phase of flight and the sustainer motor provides a sustainer thrust for the sustainer phase of flight. Aero gyro stabilization means are provided for aero gyro stabilization and a plurality of detachable drag shrouds may be incorporated for providing predetermined aerodynamic drag to achieve zone firing.

15 Claims, 5 Drawing Figures

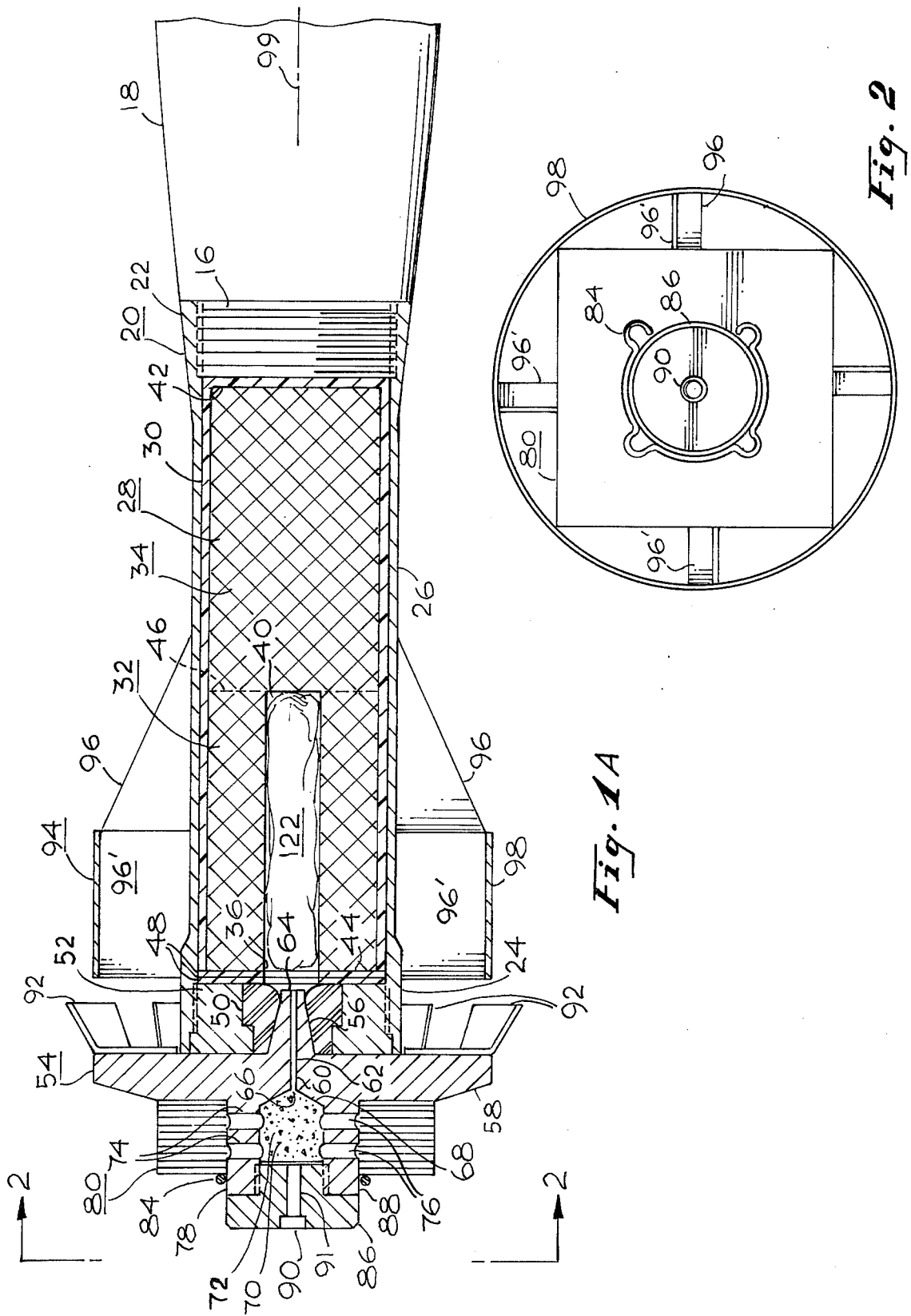

ROCKET POWERED ROUND

REFERENCE TO RELATED APPLICATIONS

This invention is related to the invention of copending patent application Ser. No. 307,444 filed Nov. 17, 1972, entitled WEAPON ARRANGEMENT and to cofiled and copending patent application Ser. No. 364,658 entitled IMPROVED ROCKET POWERED ROUND.

BACKGROUND OF THE INVENTION

1. Field of the Invention

This invention relates to the weapons art and more particularly to an improved rocket powered round launched from a tubular type launcher such as a mortar launcher.

2. Description of the Prior Art

In the above referenced copending patent application Ser. No. 307,444, there is described a rocket boosted round that may be launched from closed breach launchers. The rocket boosted round described therein incorporates a rocket boosted motor providing rocket thrust for the boost phase of flight therein.

In many applications it is desired to provide a rocket powered round that is launchable from a tubular type launcher such as a motar barrel. This is particularly advantageous where it is desired to have a comparatively large size round such as 70 or 80 millimeters. Known prior art rocket powered type rounds that may be fired from a substantially conventional mortar barrel have not been able to provide either rapid firing or a high degree of accuracy at the desired impact range. Additionally, zoning to provide variations in the range of the round have not been achievable with the prior art rounds as no structure was provided therein for controlling the range of the round after launch. Such structure for providing zoning is described in the above-mentioned copending patent application. Further, the known prior art rocket type rounds generally only incorporated a boost rocket grain for providing boost thrust during the boost phase of flight and no sustainer rocket grain was provided for generating a sustainer thrust during a sustained phase of flight after the burnout of the boost grain. The sustainer thrust is desired to provide a greater accuracy at point of impact of the round.

Thus, there has long been a need for an improved rocket boosted and sustained round for firing from a tubular type launcher such as a conventional mortar barrel.

SUMMARY OF THE INVENTION

Accordingly, it is an object of the present invention to provide an improved rocket powered round for launch from a tubular type launcher.

It is another object of the present invention to provide an improved rocket powered round having a high degree of aero gyro stability and range zoning capability.

It is another object of the present invention to provide an improved rocket boosted and sustained round that may be fired from substantially conventional tubular type mortar launchers.

The above, and other objects of the present invention, are achieved, in a preferred embodiment, by providing a rocket boosted and sustained war head round having a launch cartridge means detachably coupled to the aft end of the rocket motor and frictionally retained thereon by frictional engagement in the nozzle of the rocket motor. The launch cartridge means comprises launch propellant charge means which, if desired, may be segmented in increments to provide any desired total launch impulse by increasing or decreasing the number of segments incorporated as well as an ignition means for igniting the launch propellant charge and initiating ignition of the rocket motor. Combustion of the launch charge generates high pressure gases in the launch volume between the aft end of the launch cartridge and the base of the tubular launcher. The gas pressure reacts on the aft end of the launch cartridge to accelerate the round to the launch velocity. The rocket motor, in a preferred embodiment comprises both a boost portion and a sustainer portion. In the preferred embodiment of the present invention the boost portion is progressive, radial, burning and the sustainer portion is end burning. The boost portion in general has a higher thrust output than the sustainer portion.

The launch cartridge means has spring loaded tabs that are deformable to allow insertion into the rocket barrel and which extend outwardly as they leave the rocket barrel. A stripper plate is coupled to the launcher barrel and engages the spring tabs as they have moved to the extended position upon leaving the launcher barrel at the end of the launch phase and detaches the launch cartridge means from the round. The round continues throughout the boost phase and the sustainer phase of flight under the thrust of the rocket propellant grain which was ignited during the launch phase.

Bore riding alignment pins are coupled to the external surface of the round for engagement with the internal surfaces of the launcher barrel to provide alignment of the round therein during launch to prevent launch perturbations. Drag shroud means may be detachably mounted on the round to provide range zoning and aero gyro stabilization means generally comprising a plurality of canted fins with a ring shroud are also incorporated to provide aero gyro stabilization.

BRIEF DESCRIPTION OF THE DRAWING

The above and other embodiments of the present invention may be more fully understood from the following detailed description taken together with the accompanying drawing wherein similar reference characters refer to similar elements and in which:

FIG. 2 is a view along the line 2—2 of FIG. 1;

DESCRIPTION OF THE PREFERRED EMBODIMENTS

Figure 1B:
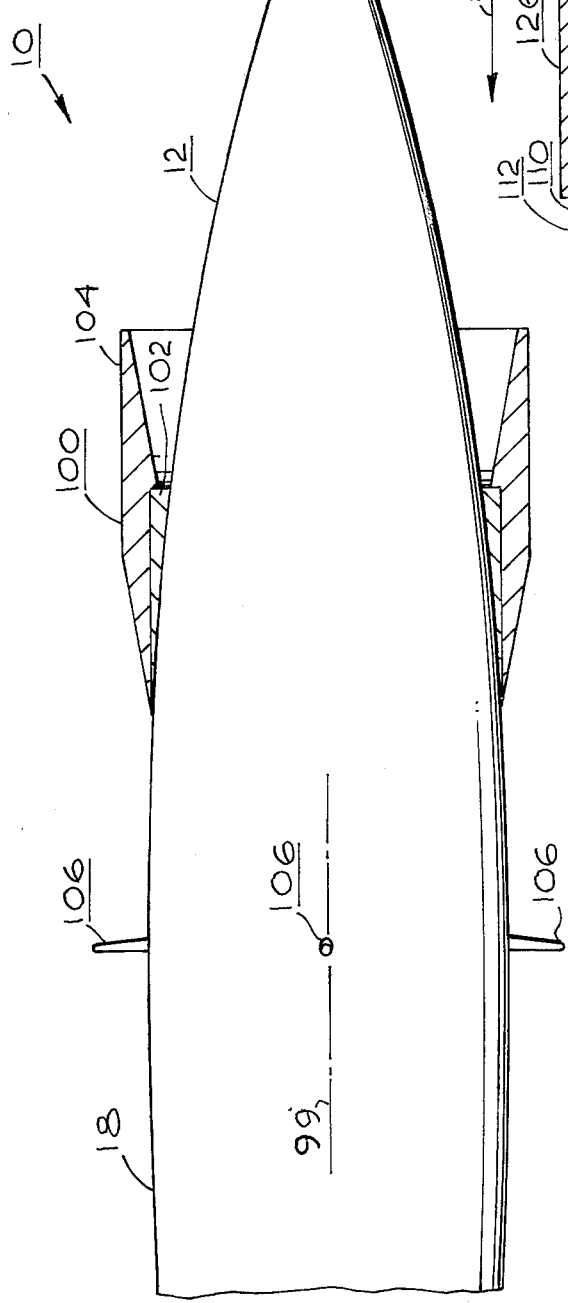
FIG. 1 is a sectional view of one embodiment of the present invention.

Referring now to the drawing there is illustrated in FIG. 1 a preferred embodiment, generally designated 10 of a rocket powered round according to the principals of the present invention. As shown on FIG. 1 the rocket powered round 10 is generally comprised of a war head 12 having a forward end 14 and an aft end 16. The war head 12 also has an external surface 18 defining a predetermined configuration. The war head 12 may be of any desired type and does not, initially, form a part of the present invention.

A rocket motor means 20 has a forward end 22 coupled to the aft end 16 of the war head 12 and, as shown in FIG. 1, the coupling is provided by a threading engagement therebetween. The rocket motor means 20 also has an aft end 24 spaced from the forward end 22 thereof. The rocket motor means 20 generally comprises a rocket motor casing 26 having a rocket propellant grain 28 positioned therein and separated from the rocket motor casing 26 by a liner means 30. The rocket propellant grain 28 may, in some embodiments, comprise only a boost portion, or as illustrated in FIG. 1, may generally comprise a boost portion 32 and a sustainer portion 34. As shown on FIG. 1, the boost portion 32 and sustainer portion 34 of the rocket propellant grain 28 are fabricated from an integral grain. The boost portion 32 is progressive, radial, burning from the interior surface 36 thereof towards the peripheral walls 38 thereof. The boost portion 34 is end burning from the aft end 40 thereof to the forward end 42 thereof. In the preferred embodiments of the present invention the thrust produced by the boost portion 32 is greater than the thrust produced by the sustainer portion 34 of the rocket propellant grain 28, and, preferably, provides a thrust substantially equal to the drag of the round 10 at the burnout of the boost portion 32.

It will be appreciated that, if desired, the rocket propellant grain 28 may be fabricated from two separate rocket propellant grains, one providing the boost thrust and a second providing the sustainer thrust. In such a fabrication the boost portion 32 would extend from the aft end 44 thereof to the interface with the sustainer portion 34, which interface is indicated by the dashed line 46. The sustainer portion 34 would extend from the interface 46 to the forward end 42 thereof.

The boost portion 32, in this embodiment of the present invention, is, as noted above, radial burning and thus is inhibited from burning on the end surface 44 and outer surface 38 so that burning progresses from the inner surface 36 radially outwardly. Inhibitors 48 may be provided at the aft end 44 of the boost portion 32 to inhibit end burning therealong.

The rocket motor means 20 also comprises a nozzle portion 50 having a preselected nozzle area communicating with the rocket propellant grain 28. The nozzle portion 50 is retained adjacent the aft end 24 of the rocket motor means 28 by retainer plate 52 threadingly engaging the aft end 24 of rocket motor means 20.

A launch cartridge means generally designed 54 is detachably coupled to the aft end of the rocket motor means 20. The detachable coupling, in the embodiment shown on FIG. 1, is provided by a frictional fit between a probe portion 56 of a body member 58 of the launch cartridge means 54 in the nozzle portion 50 of the rocket motor means 20. The frictional fit therein provides a predetermined frictional force for detachably retaining the launch cartridge means 54 adjacent the aft end 24 of the rocket motor means 20. The body member 58 of the launch cartridge means 54 has first walls 60 defining an orifice 62 extending through the probe portion 56 and the orifice 62 has a preselected orifice area less than the preselected nozzle area of the nozzle portion 50. The orifice 62 communicates at its forward end 64 with the rocket propellant grain 28 and at its aft end 66 with second walls 68 defining an ignition charge cavity 70 having an ignition charge 72 contained therein. The body member 58 is also provided with third walls 74 defining aperture 76 communicating with the ignition charge cavity 70 and extending, in this embodiment of the present invention, radially outwardly to the peripheral edge 78 of the body member 58.

A launch propellant charge means 80 is mounted on the peripheral walls 78 of the body member 58 and in ignition induced relationship to the apertures 76. The launch propellant charge means 80 may, in preferred embodiments of the present invention, comprise a plurality of separate launch propellant charge increments 82. The number of launch propellant charge increments selected for the launch propellant charge means 80 may be any number desired to provide a preselected launch force. Thus, the launch propellant charge means 80, according to the principals of the present invention, provides incremental launch charges 82 retained on the body member 58 by retainer spring clip means 84.

An end cap 86 is coupled to the aft end 88 of the body member 58 by, for example, a threading engagement therebetween and the end cap 86 has a launch percussion primer 90 therein communicating with the ignition charge 72 in the ignition charge cavity 70.

The composition of the percussion primer 90 and ignition charge 72 are well known in the art and any desired composition may be utilized to provide the desired ignition of the charges as described below in greater detail.

A plurality of spring tab means 92 are coupled to the body member 58 of the launch cartridge means 54. The spring tab means 92 are resiliently deformable from an extended diameter, as shown in FIG. 1, radially inwardly to a second diameter less than the extended diameter 92 to allow insertion in the tubular launcher barrel, as described below in greater detail.

An aero-gyro stabilization means, generally designated 94, is coupled to the rocket motor means 20 adjacent the aft end 24 thereof. Aero-gyro stabilization means 94 provides aero-gyro stabilization during the trajectory of the embodiment 10 after launch thereof and generally may comprise a plurality of canted fins 96 which, in the embodiment 10 shown on FIG. 1 and as illustrated in greater detail on FIG. 2, comprises four canted fins 96 and a ring shroud 98 coupled thereto. The fins 96 have a canted portion 96' that are not aligned with the longitudinal axis 99 of the embodiment 10 to provide spin stabilization during flight. The angle of cant may be selected, for example, to be between 5° and 20° as required for effective spin rates. As utilized herein, aero-gyro stability is defined to mean the condition when the center of pressure is aft of the center of gravity and there is a spin rate of the rocket powered round 10 that is at least one order of magnitude larger than the yawing frequency of the round 10 for the condition of the round 10 not spinning.

Since, for a given launch angle, the range of the round 10 depends upon the drag characteristics thereof, in the preferred embodiments of the present invention detachably mountable means are utilized to vary the drag characteristics in order to achieve variations in the range of the round 10 for a given angle of launch. This effect is called range zoning and, for example, to decrease the range for a given angle of launch a drag shroud means generally designated 100 may be detachably mounted on the external surface 18 of the war head 12 adjacent the forward end 14 thereof. The drag shroud means 100 comprises a first portion 102 and a second portion 104. The first portion 102 is detachably mounted on the external surface 18 of the war head 12 and the drag forces during flight retain the first portion 102 thereon together with the firctional forces associated with the engagement therebetween. Similarly, the second portion 104 may be detachably mounted on the first portion 102 and retained thereon by frictional engagement therewith and is retained in place during flight by the drag forces acting thereon. The first portion 102 of the drag shroud 100 increases the drag characteristics of the round 10 by a first known predetermined drag to provide a drag greater than the drag of the round free of the drag shroud 100. The second portion 104 provides a further increase by a known preselected amount in the drag. Thus, for the configuration shown in FIG. 1 there can be provided three zones of firing range for any given angle of launch and any given number of launch charge increments 82. The minimum ranch is achieved with incorporation of both the first portion 102 and second portion 104 installed on the round 10 to provide the greatest drag. An intermediate range is provided by incorporating only the first portion 102 and maximum range is achieved by omitting the drag shroud 100 entirely. Appropriate firing tables are utilized to show the range for a given angle of launch and a given number of launch charge increments 82 incorporated for the round free of the drag shroud 100, incorporating the first portion 102 thereon and incorporating both the first portion 102 and 104 thereon.

A plurality of streamlined bore riding pins 106 are also coupled to the external surface 118 of the war head 12 and extend radially outwardly to a preselected diameter corresponding to the internal diameter of the launch tube barrel utilized to launch the round 10. This is discussed below in greater detail in connection with the description of FIG. 3.

As noted above the rocket propellant grain 28 may incorporate a boost portion 32 and a sustainer portion 34 to provide a boost and sustained portion of powered flight of the round 10. It has been found that the thrust provided by the sustainer portion 34 provides two important characteristics to the round 10 increasing the accuracy at impact thereof. The thrust provided by the sustainer portion 34 after the burnout of the boost portion 32 tends to make cross wind drift, when the round 10 is fired into a cross wind, approach zero and, at high angle fire, for example 60° to 80° at launch, the velocity of the round at the peak of the trajectory is maintained at a sufficient value to provide the desired aero-gyro stability by the aero-gyro stabilization means 94.

It has been found that, when a round 10 having aero-gyro stability is fired into a cross wind, it has an induced yaw angle to the relative wind and the forward portion 14 of the war head 12 is turned to line up with the relative wind vector. As long as the round is in the cross wind the forward portion 14 of the war head 18 will tend to precess and nutate about the relative wind vector. In the absence of a sustainer thrust provided by sustainer portion 34 of the rocket propellant grain 28, the round would tend to drift in the direction of the cross wind. However, when a sustainer portion 34 is provided the thrust vector therefrom balances the drag vector and the cound tends to maintain the desired heading with the desired velocity.

When the round 10 is fired at a comparatively high angle, for example 60° to 80°, gravity and drag forces cause a non-sustained round to lose a high percentage of the maximum velocity as the round approaches the peak of the trajectory. When the round loses too much velocity, the aero-gyro stability becomes marginal and drift from the correct trajectory with a comparatively large dispersion vector will occur. However, when a sustainer portion 34 is provided the sustainer thrust maintains the velocity at an acceptable level for aero-gyro stability and the rounds maintain the proper trajectory minimizing any tendency towards large dispersion. For example, if the round has a predetermined maximum velocity at the end of the burnout of the boost portion 32 of the rocket propellant grain 28 and a launch angle of approximately 75°, the velocity at the peak of the trajectory will be on the order of 15 percent of the maximum velocity. However, if a sustainer portion 34 is also provided having a predetermined boost thrust the velocity at the peak of the trajectory for a 75° launch angle may be maintained at approximately 40 percent of the maximum velocity which is sufficient to provide the desired aero-gyro stability and minimize the dispersion vector. Thus, incorporation of the sustainer portion 34 provides a much greater accuracy at impact than a round without the sustainer thrust.

It has been found, for example, when the war head 12 has a maximum diameter on the order of 76 millimeters and a total weight for the entire round of approximately twelve pounds, of which the war head is approximately nine pounds, the boost portion 32 of the rocket propellant grain 28 may provide a maximum thrust of approximately 120 pounds for one second and the sustainer portion 34 provides a sustainer thrust of approximately fourteen pounds for sixteen seconds. These characteristics are illustrated graphically in FIG. 4.

Figure 4:
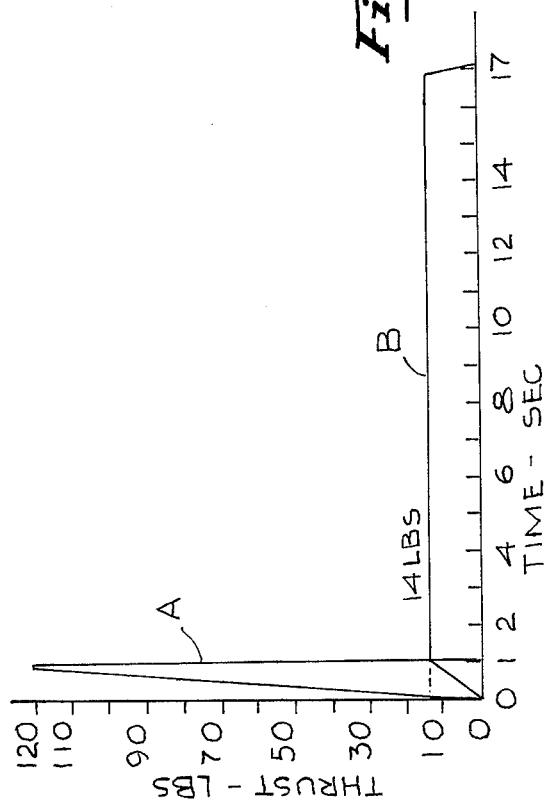
FIG. 4 is a graphical representation of the thrust-time characteristics of an embodiment of the invention.

As shown on FIG. 4, curve A illustrates the thrust-time curve for the boost portion 32 of the rocket propellant grain 28 and shows a peak thrust of 120 pounds thereof for approximately one second. By the time the boost portion 32 burns out the sustainer portion 34 has built up to approximately its maximum thrust of fourteen pounds as shown by curve B, and burns for a total of approximately sixteen seconds at the fourteen pound thrust level. Thus, as noted above, in some applications of the present invention it may be desirable to provide two separate rocket propellant grains, one for the boost portion 32, one for the sustainer portion 34 and, in such an embodiment, they may be fabricated from different rocket propellant materials having different compositions.

The round 10 may be fired from a tubular type launcher substantially similar to a conventional mortar tube. As shown on FIG. 3 the barrel 110 of such a tubular type launcher 112 has an internal surface 114 having a predetermined diameter. The round 10 is inserted into the barrel 112 and the spring tabs 92 are resiliently deformed from their extended position, shown in full line in FIG. 3, to the deformed position shown in dashed lines in FIG. 3. The deformed position corresponds to a diameter equivalent to the predetermined diameter of the internal surface 114 of the barrel 110. The spring tabs thus bear against the internal surface 114 while the round 110 is in the launcher 112. The bore riding pins 106 have an external diameter substantially equivalent to the predetermined diameter of the internal surface 114 and thus bear against the surface 114 to provide proper alignment of the round 10 in the barrel.

When the round 10 is to be launched, it is inserted into the barrel 110 and moves downwardly in the barrel 110 in the direction of the arrow 116. Both the spring tabs 92 and the bore riding alignment pins 106 bear against the internal surface 114 to provide the desired alignment of the round 10 in the barrel 110. As the round 10 abuts the base portion 118 of the tubular type launcher 112 a firing pin 120 is triggered and strikes the launch percussion primer 90. The primer charge therein deflagrates and emits hot particles of combustion through the aperture 91 to impinge on the ignition charge 72 contained within the ignition charge cavity 70. The ignition charge 72 is ignited and the hot particles of combustion therefrom extend through the apertures 76 to ignite the launch propellant charge increments 82 of the launch propellant charge means 80. The gases generated by the combustion of the charge increments 82 expand in the launch volume 82 between the base 118 of the tubular type launcher 112 and the aft end 53 of the body member 58. The forces thus produced react on the aft end 53 of the body member 58 and accelerate the round 10 to the desired launch velocity. Varying the number of launch charge increments, it will be appreciated, varies the launch force and thus the launch velocity achieved. Simultaneously, hot particles of combustion from the ignition charge 72 travel through the orifice 62 and ignite a rocket ignition charge 122 which may be positioned inside the internal surfaces 36 of the boost charge 32. It will be appreciated that, if desired, the rocket ignition charge 122 may be eliminated and the products of combusion traveling through the orifice 62 may impinge directly on the surfaces 36 of the boost portion 32 of the rocket propellant grain 28 providing ignition thereon as well as on the end surface 40 of the sustainer portion 34 of the rocket propellant grain 28. In any event, ignition is provided on both the surfaces 36 and 40. The preselected, comparatively small, area of the orifice 62 is selected to reduce the pressure build up on the propellant grain 28 during the launch phase thereof. It has been found desirable to incorporate a reduced area provided by the orifice 62 less than the preselected area of the nozzle 50 during the launch phase in order to eliminate the possibility of cracking the rocket propellant grain 28. Thus, reducing the amount of hot products of combustion from the ignition charge means 72 that impinge upon the rocket ignition charge 122 and/or the rocket propellant grains surfaces 36 and 40 prevent undesired pressure buildup on the rocket propellant grains 28 which, as noted above, in some embodiments may tend to fracture or rupture the rocket propellant grain 28.

Figure 3:
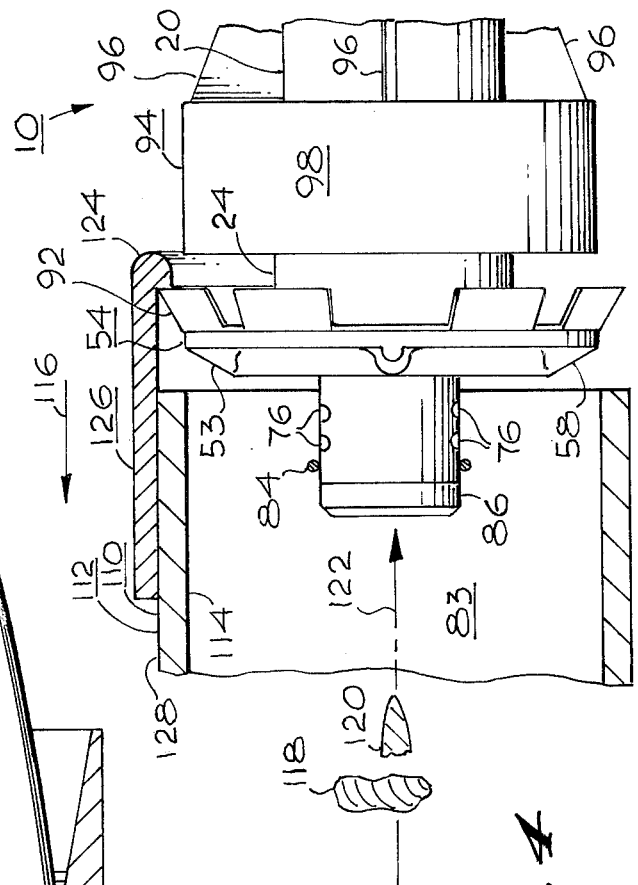
FIG. 3 is a view, partially in section, of the embodiment of FIG. 1 leaving a tubular launcher.

The hot products of combustion provided by the ignition of the launch propellant charge 80 in the barrel 110 react on the launch cartridge body member 58 and move the round 10 in the direction indicated by the arrow 122 out of the launcher 112. As the spring tabs 92 leave the launcher barrel 110 they resiliently extend outwardly to their extended diameter shown in full line on FIG. 3 and engage an engagement portion 124 of a stripper plate 126 coupled to the external surface 128 of the barrel 110. The engagement portion 124 has a diameter that is greater than the preselected diameter of the internal surface 114 of the barrel 110 and is less than the extended diameter of the spring tabs 92 and, as shown in FIG. 3, extends around the barrel 110 less than a full circumference thereof. Since the launch cartrige means 54 is retained on the round 10 by the frictional engagement of the portion 56 with the nozzle 50, the aerodynamic drag exerted on the launch cartridge means 54 together with the force applied by the engagement of spring tabs 92 with the stripper plate 126 detaches the launch cartridge means 54 from the round 10 and it falls under gravity forces, in front of the launcher 112. The boost portion 32 of the rocket propellant grain 28 rapidly builds up to full thrust, as shown on FIG. 4, after ignition thereof and provides the boost thrust desired. Similarly, the sustainer portion 34 of the rocket propellant grain 28 builds up to the desired sustainer thrust level, approximately at the end of the boost phase of flight, and the sustainer thrust maintains the desired thrust level for the predetermined time of the sustainer phase of flight of the round 10.

Depending upon the drag characteristic desired by the inclusion or omission of the drag shroud means 100 and the number of increments of the launch propellant charge 80 that are incorporated, together with the angle of launch, the round 10 may impact during the sustainer phase of flight or after the sustainer portion 34 has burned out. The desired angle of launch may be any desired angle between horizontal and, for example, 80° from the horizontal depending upon the desired impact area.

This concludes the description of the improved rocket powered round in accordance with the principals of the present invention. Those skilled in the art may find many variations and adaptations of the invention. The following claims are intended to cover all such variations and adaptations falling within the true scope and spirit thereof.

We claim:

1. A rocket powered round of the type having a launch phase and a powered phase of flight and for insertion in a tubular type launcher having a predetermined tubular diameter and a launch end, for launch therefrom, and comprising, in combination:

a war head having a forward end, an aft end and an external surface;

a rocket motor means having:

a forward end coupled to said aft end of said war head;

an aft end;

a rocket propellant grain;

a nozzle portion having a preselected nozzle area and communicating with said rocket propellant grain, and said nozzle portion at said aft end of said rocket motor means;

a launch cartridge means detachably coupled to said aft end of said rocket motor and removable therefrom for the condition of the end of the launch phase, and said launch cartridge means comprising:

launch propellant charge means for providing a preselected launch force;

ignition means for initiating ignition of said launch propellant charge means and said rocket propellant grain; and stripper means operatively cooperating with said tubular launcher for detaching said launch cartridge means from said rocket motor means for the condition of said launch phase completed, and said stripper means comprises a spring tab engagement portion coupled to said launcher tube and spaced axially outwardly from said launch end thereof and radially outwardly from a projection of said predetermined tube diameter, and a tab means coupled to said launch cartridge means, and said tab means extendable in a radially outwardly direction to a dimension greater than said predetermined tube diameter for the condition rocket motor free of said launch tube at the end of said launch phase of flight and said tab means engaging said spring tab engagement portion, whereby said launch cartridge means is detached from said rocket motor and falls in external regions free of said tubular launcher.

2. The arrangement defined in claim 1 and further comprising:
aero gyro stabilization means coupled to said aft end of said rocket motor means for providing aero gyro stabilization during said powered phase of flight, and said aero gyro stabilization means extending radially from said rocket motor means a distance less than said predetermined tube diameter of said tubular type launcher.

3. The arrangement defined in claim 2 and further comprising:
drag shroud means mountable on said external surface of said war head for providing predetermined aerodynamic drag forces, and said drag shroud means extending radially outwardly from said war head means a distance less than said predetermined tube diameter of said tubular type launcher.

4. The arrangement defined in claim 3 and further comprising:
bore riding pin means coupled to said external surface of said war head and extending radially outwardly therefrom substantially said predetermined tube diameter of said tubular type launcher for engagement therewith for the condition of said bore riding pin means in the launcher.

5. The arrangement defined in claim 3 wherein:
said aero gyro stabilization means further comprises:
a plurality of canted fins; and
a ring shroud coupled to said plurality of canted fins.

6. The arrangement defined in claim 1 wherein said launch cartridge means further comprises:
a body member having:
a probe portion insertable in said nozzle of said rocket motor means for reducing said preselected area thereof, and said probe portion having first walls defining an orifice therethrough having a preselected orifice area less than said preselected nozzle area, and said orifice having a first end communicating with said rocket motor grain and a second end spaced therefrom;
second walls communicating with said second end of said orifice and defining an ignition charge cavity; and
third walls providing apertures between said ignition charge cavity and regions external said body member;
an ignition charge means in said ignition charge cavity of said body member; and
said launch propellant charge means coupled to said body member in regions adjacent said third wall thereof, whereby ignition of said ignition charge means generates ignition producing gases passing through said orifice of said probe portion for initiating ignition of said rocket motor grain and through said apertures defined by said third walls for igniting said launch propellant charge means.

7. The arrangement defined in claim 6 wherein said launch cartridge means further comprises:
a plurality of separate launch propellant charge increments;
and further comprising:
launch propellant charge increment retaining means detachably mountable on said body member for retaining a preselected number of said launch propellant charge increments thereon.

8. The arrangement defined in claim 7 wherein said stripper means further comprises:
said tab means further comprises a plurality of spring tab means coupled to said body member of said launch cartridge means and resiliently deformable from an extended position having an extended diameter greater than said predetermined tube diameter of said tubular type launcher to a deformed position allowing insertion in said tubular type launcher; and
said spring tab engagement portion further comprising a stripper plate coupled to said tubular launcher and said stripper plate having said spring tab engaging portion thereon and extending partially around the circumference of said tubular launcher for engaging said spring tabs on said launch cartridge means for the condition of said spring tabs in said extended position thereof,
whereby said stripper plate engages said spring tab means as said launch cartridge means leaves said tubular launcher and detaches said launch charge means from said rocket motor.

9. The arrangement defined in claim 1 wherein said powered phase of flight comprises a boost phase and a sustainer phase and wherein:
said rocket propellant grain comprises a boost portion for providing a predetermined boost thrust and a sustainer portion for providing a predetermined sustainer thrust.

10. The arrangement defined in claim 9 wherein said boost portion of said rocket propellant grain is radial burning and said sustainer portion of said rocket propellant grain is end burning.

11. The arrangement defined in claim 10 and further comprising:
aero gyro stabilization means coupled to said aft end of said rocket motor means for providing aero gyro stabilization during said boost phase and said sustainer phase of flight, and said aero gyro stabilization means extending radially from said rocket motor means a distance less than said predetermined tube diameter of said tubular type launcher.

12. The arrangement defined in claim 11 and further comprising:
bore riding pin means coupled to said external surface of said war head and extending radially outwardly therefrom substantially said predetermined tube diameter of said tubular type launcher for engagement therewith for the condition of said bore riding pin means in the launcher.

13. The arrangement defined in claim 12 and further comprising:
drag shroud means mountable on said external surface of said war head for providing predetermined aerodynamic drag forces, and said drag shroud means extending radially outwardly from said war head means a distance less than said predetermined tube diameter of said tubular type launcher.

14. The arrangment defined in claim 13 wherein said launch charge means further comprises:
a body member having:
  a probe portion insertable in said nozzle of said rocket motor means for reducing said preselected area thereof, and said probe portion having first walls defining an orifice therethrough having a preselected orifice area less than said preselected nozzle area, and said orifice having a first end communicating with said rocket motor grain and a second end spaced therefrom;
  second walls communicating with said second end of said orifice and defining an ignition charge cavity; and
  third walls providing apertures between said ignition charge cavity and regions external said body member;
an ignition charge means in said ignition charge cavity of said body member; and
said launch propellant charge means coupled to said body member in regions adjacent said third wall thereof, whereby ignition of said ignition charge means generates ignition producing gases passing through said orifice of said probe portion for initiating ignition of said rocket motor grain and through said apertures defined by said third walls for igniting said launch propellant charge means.

15. The arrangement defined in claim 14 wherein said launch charge means further comprises:
a plurality of launch propellant charge increments; and further comprising:
  launch propellant charge increment retaining means detachably mountable on said body member for retaining a preselected number of said launch propellant charge increments thereon;
  a plurality of spring tab means coupled to said body member of said launch cartridge means and resiliently deformable from an extended position having an extended diameter greater than said predetermined tube diameter of said tubular type launcher to a deformed position allowing insertion in said tubular type launcher; and
  a stripper plate coupled to said tubular type launcher and said stripper plate having a spring tab engaging portion for engaging said spring tabs on said launch cartridge means for the condition of said spring tabs in said extended position thereof,
whereby said stripper plate engages said spring tab means as said launch cartridge means leaves said tubular type launcher and detaches said launch charge means from said rocket motor.

* * * * *